July 17, 1956
E. C. BIDWELL
2,754,641
WORK HOLDING AND CLAMPING MECHANISM
FOR CENTERLESS GRINDING MACHINES
Filed Feb. 1, 1954
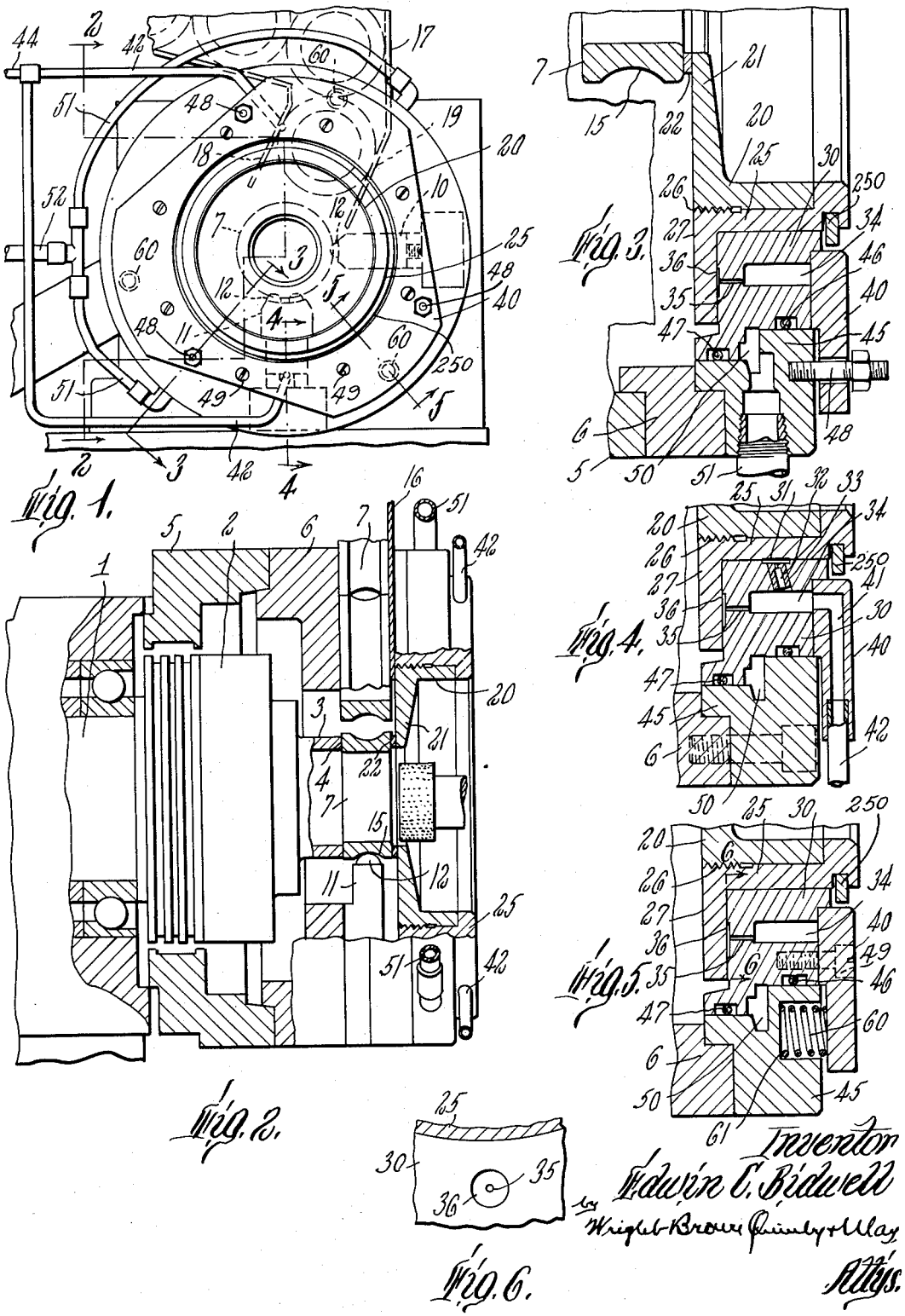
Inventor
Edwin C. Bidwell
by Wright, Brown, Quimby & May
Attys.

United States Patent Office 2,754,641
Patented July 17, 1956

2,754,641

WORK HOLDING AND CLAMPING MECHANISM FOR CENTERLESS GRINDING MACHINES

Edwin C. Bidwell, Grafton, Vt., assignor to Bryant Chucking Grinder Company, Springfield, Vt., a corporation of Vermont Application February 1, 1954, Serial No. 407,342

1 Claim. (Cl. 51—236)

This invention relates to means for supporting and clamping work, particularly suitable for centerless grinding, and is illustrated herein as applied to a machine for internal grinding as, for example, described in patent to Arms et al. No. 2,635,395.

More particularly, this invention provides for means for holding a work piece clamped against a rotating driver, such means comprising a piston movable in one axial direction to clamp the work piece and in the opposite direction to unclamp the work piece, and inside the piston a rotatable work clamping member, and utilizing fluid pressure to form thrust and journal bearings between the piston and member with means independent of the journal bearing function for controlling the thrust bearing pressure so as to clamp the work piece or permit its release as by spring means.

For a complete understanding of this invention, reference may be had to the accompanying drawings in which:

Figure 1 is a front elevation of the rotary spindle and related parts of a centerless grinding machine embodying the invention.

Figures 2 to 5, inclusive, are detail sectional views on the correspondingly numbered section lines of Figure 1.

Figure 6 is a detail sectional view on line 6—6 of Figure 5.

Referring to the drawings, at 1 in Figure 2 is illustrated a rotary spindle having a spindle nose member 2. To this spindle nose member may be secured by any suitable means an annular driver 3 having an outer face 4 transverse to the axis of rotation of the spindle against which work pieces to be ground may be clamped. Surrounding the spindle is a stationary tubular member 5 which carries an annular plate 6, one face of the plate 6 serving as a guide wall for the passage of work pieces 7 into position opposite to the driver 3. This plate 6 further serves as a holder for the angularly spaced supports 10 and 11 shown as provided with ball point shoes 12 engaging an annular groove 15 in the work piece 7 in grinding position and which as shown is the inner race member of a ball bearing.

At 16 is shown a plate spaced forwardly from the plate 6 to form therewith a channel for the passage of work pieces to be ground which may be contained in a supply reservoir 17 above the spindle. Side wall members 18 and 19 (see Figure 1) guide the work pieces from the supply toward grinding position.

The work piece in grinding position is clamped against the face 4 of the driver 3 and for this purpose an annular clamp 20 is illustrated. This clamp 20, as shown best in Figure 3, has an inwardly projecting web 21, the inner edge of which is adapted to carry a ring 22 which is pressed against the outer face of the work piece in grinding position and holds it against the driver 3 as will later more fully appear. This clamp 20 is shown as of angular cross section and is secured to an annular member 25 as by a threaded connection at 26. This member 25 has an outwardly extending flange 27 which is spaced slightly from a non-rotatable piston 30 this space limited to a predetermined maximum by a ring member 250. This piston 30 has further a running clearance relative to the journal formed by the part 25, and is held against rotation by three studs 48 carried by the member 45 and extending through the plate 40 which is secured to the piston as by screws 39. Within the spaces between the parts 30 and 25 air is introduced under pressure to form an air bearing between these parts. Spaced around on the inside annular face of the piston 30 are shallow pools at 31 and small diameter nozzle members 32 (Figure 4) may be seated each in a passage 33 leading thereto for taking compressed air from an annular chamber 34 in the piston 30 and directing it between the inner face of the piston 30 and the member 25. A series of small perforations 35 may also lead from this annular chamber 34 to the central portions of shallow pools 36 similar to the pools 31, and shown best in Figure 6, between the confronting faces of the piston 30 and the flange 27 to lead in air between their faces also.

An annular plate 40 closes the outer face of the passage 34 but may be provided with one or more air passages 41 leading to the passages 34 and to which air supply pipes 42 may lead. As shown in Figure 1, there are two such pipes 42 for the air, arranged substantially diametrically opposite to each other and connected to a common supply pipe 44. The piston 30 is movable axially and the clamp formed by the parts 20 and 25 is rotatable thereon with the interposed air bearing space therebetween.

The piston 30 itself is mounted for axial slidable motion on a stationary annular member 45 which is attached to the plate 6. O ring packings 46 and 47 are interposed between the outer and inner portions of the piston 30 and member 45 at either side of an annular passage 50 between the piston 30 and stationary member 45 into which air under pressure may be introduced through pipes 51, two such pipes being shown in Figure 1, connected together to a single supply pipe 52. Air pressure supplied to the passage 50 presses the piston 30 axially in a direction to press the work clamp against the work piece and hold it into engagement with the driver 3 so as to be rotated by the rotation of the spindle.

Air supply to move the piston axially should be controlled independent of the air introduced between the piston and the clamp plate, the latter furnishing the antifriction rotational radial and thrust bearing for the clamping member while the other provides for the axial motion which clamps the work. Releasing of the work is effected by a series of springs 60 shown in Figure 5 and seated in recesses 61 in the outer face of the member 45 and bearing against the plate 40 in a direction to press this plate and the piston carried thereby out of clamping engagement with the work piece.

While the work clamp is retracted by the springs 60 a work piece is moved into clamping position, and the clamp is closed by admitting pressure to the pipes 51. Air under pressure may be supplied continuously to the pipes 42 as it is desirable not to stop the rotation of the clamping device while the work pieces are being fed into and out of clamped position.

From the foregoing description of an embodiment of this invention, it should be evident to those skilled in the art that various changes and modifications may be made therein without departing from its spirit or scope.

I claim:

In combination with a rotary spindle carrying a driver at one end presenting a face transverse to the axis of said spindle and against which an article to be ground may be clamped, a rotary clamp mounted for motion lengthwise of said axis and engageable with the outer face of a work piece engaging said transverse face, a piston on which said clamp is rotatable, said clamp having a flange projecting between said spindle and piston, means for introducing fluid under pressure between said piston and clamp and between said flange and piston, a supporting member on which said piston is axially slidable, said piston and supporting means presenting annular faces transverse to said axis, means for introducing fluid under pressure between said annular faces to force said faces apart and said piston toward said spindle, said piston and supporting means having other confronting annular faces, and yielding means positioned between said other annular faces tending to separate said other annular faces and to move said piston away from said spindle to thereby release the article from clamping engagement with said face plate.

References Cited in the file of this patent

UNITED STATES PATENTS

| | | |
|---|---|---|
| 1,611,545 | Maybach | Dec. 21, 1926 |
| 2,118,020 | Curtis | May 17, 1938 |
| 2,205,989 | Meyers | June 25, 1940 |
| 2,226,309 | Gleasman | Dec. 24, 1940 |
| 2,501,387 | Haumann | Mar. 21, 1950 |
| 2,665,112 | Ashton | Jan. 5, 1954 |
| 2,715,304 | Dix | Aug. 16, 1955 |

FOREIGN PATENTS

| | | |
|---|---|---|
| 17,167 | Great Britain | 1911 |